Figure 1:
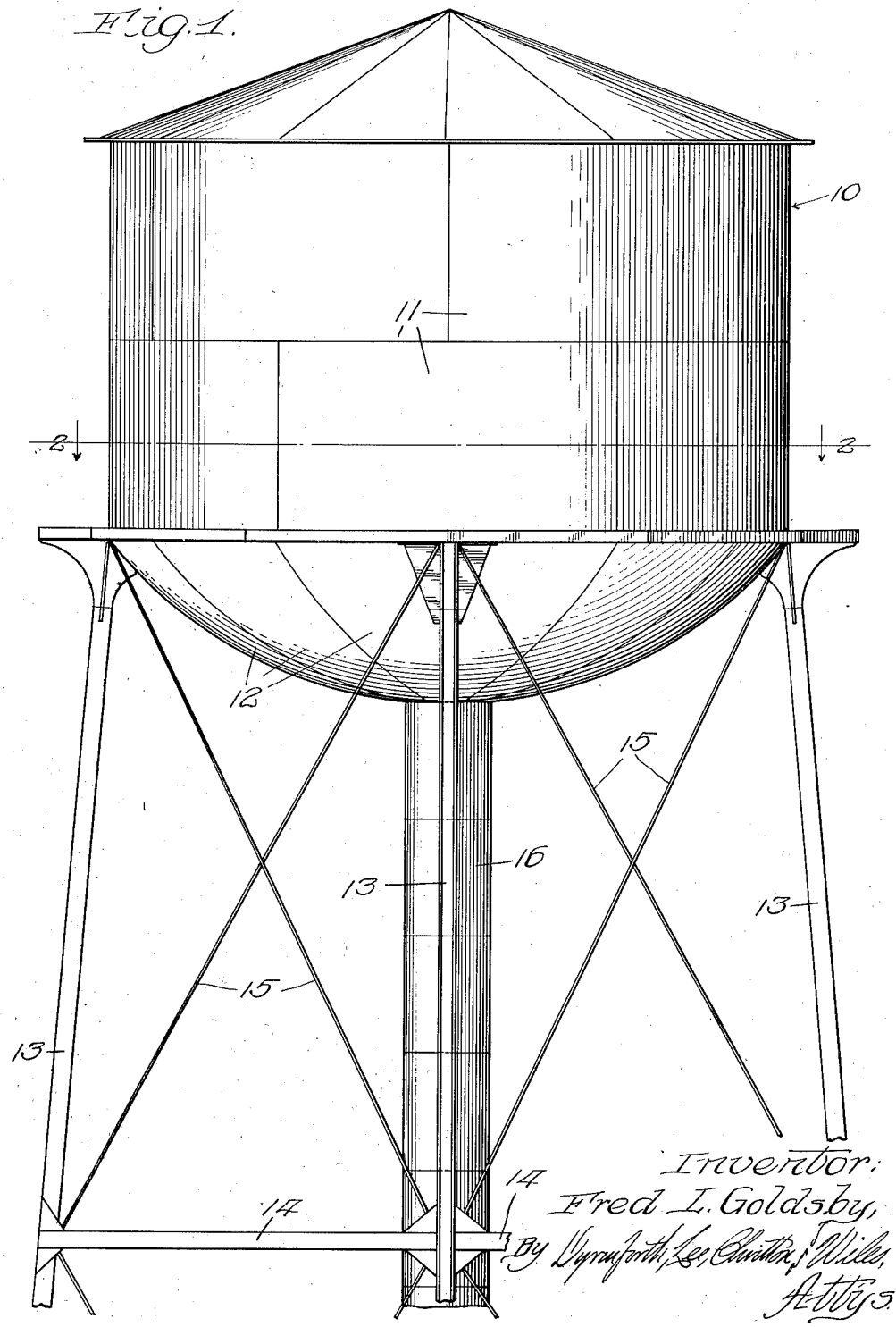

Aug. 28, 1934.  F. L. GOLDSBY  1,971,342
TANK
Filed May 12, 1932  3 Sheets-Sheet 1

Inventor:
Fred L. Goldsby,

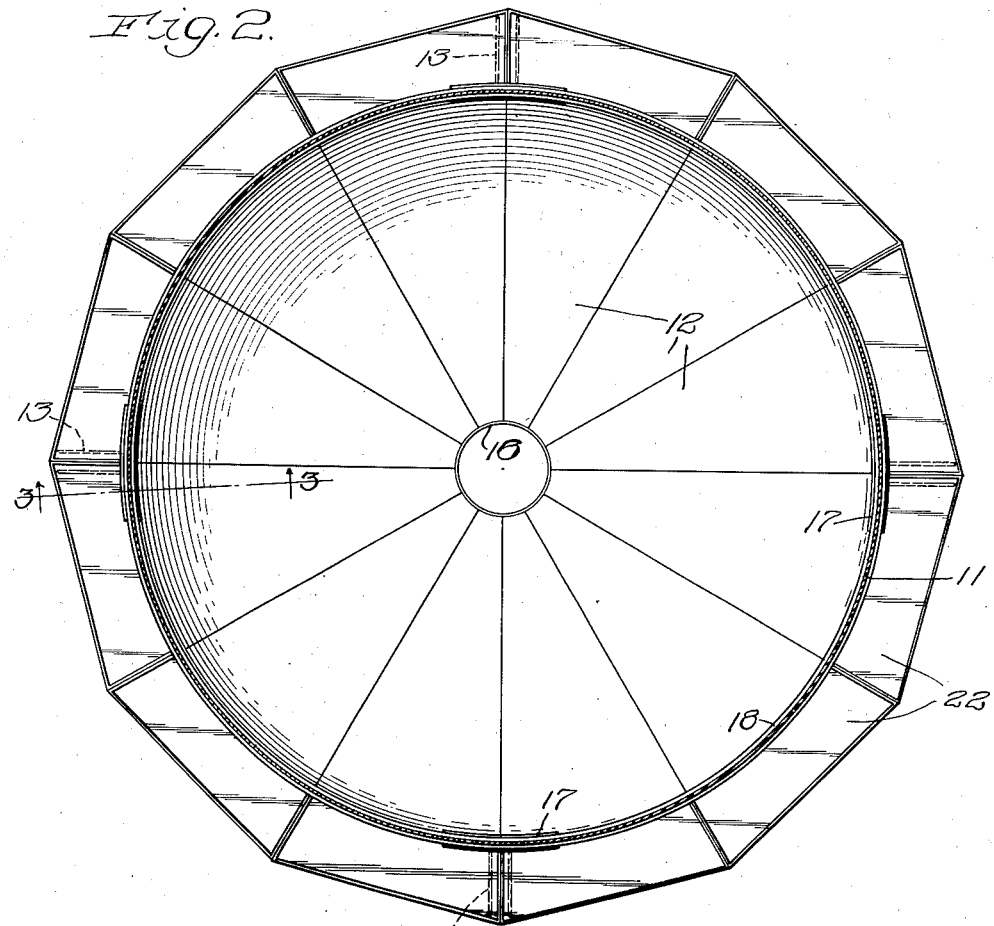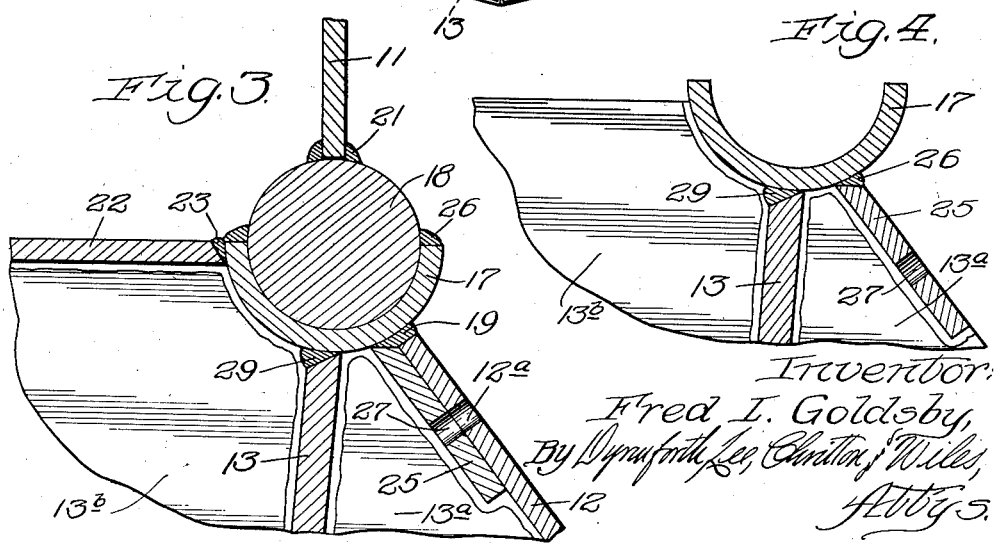

Aug. 28, 1934.  F. L. GOLDSBY  1,971,342
TANK
Filed May 12, 1932  3 Sheets-Sheet 3
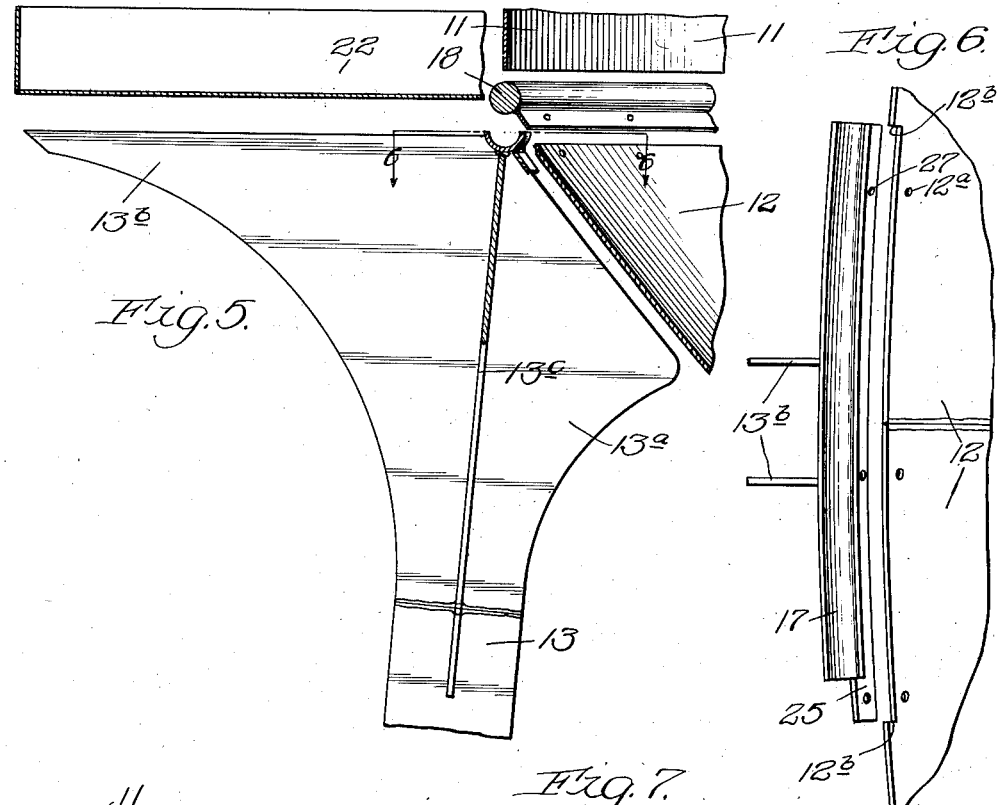
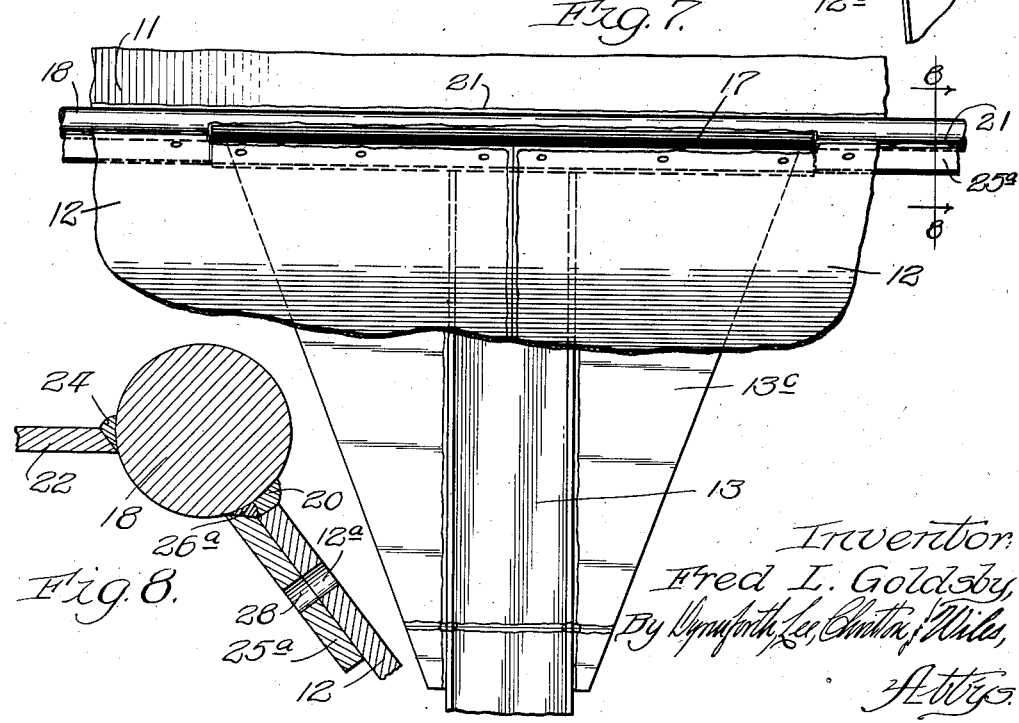

Patented Aug. 28, 1934

1,971,342

UNITED STATES PATENT OFFICE 1,971,342

TANK

Fred L. Goldsby, Chicago, Ill., assignor to Chicago Bridge & Iron Company, Chicago, Ill., a corporation of Illinois Application May 12, 1932, Serial No. 610,937

3 Claims. (Cl. 220—69)

This invention relates to improvements in tanks and, more especially, the construction of elevated steel tanks.

My invention is especially applicable to tanks of welded or partly welded construction, since it permits the welding of certain units in the shop, promotes assembly of the units in the field, and facilitates the final welding in the field to complete the structure.

By the use of my invention, I also provide a strong, rigid, stable structure with a high efficiency in labor and materials.

Other features and advantages of my invention will appear more fully as I proceed with my specification.

In that form of device embodying the features of my invention shown in the accompanying drawings—

Figure 1 is a view in side elevation; Fig. 2 is a view taken as indicated by the line 2 of Fig. 1; Fig. 3 is a view taken as indicated by the line 3 of Fig. 2; Fig. 4 is a view similar to Fig. 3 showing certain parts preferably welded in the shop; Fig. 5 is an exploded view similar to Fig. 3; Fig. 6 is a view taken as indicated by the line 6 of Fig. 5; Fig. 7 is a view looking outwardly from the inside toward the top of one of the posts; and Fig. 8 is a view taken as indicated by the line 8 of Fig. 7.

As shown in the drawings, 10 indicates a cylindrical tank made of metal shell plates welded or otherwise fastened together. This tank is provided with a curved bottom formed of the curved sector-shaped bottom plates 12. 13, 13 indicate the usual posts with struts 14 and tie rods 15. 16 indicates a vertical central riser pipe.

The invention relates particularly to the method and means for joining the posts, shell plates and bottom plates together to form the completed structure. Each of the posts 13 carries at its upper end an arc-shaped trough 17. 18 indicates a ring member lying in said troughs. The bottom plates 13 have their upper edges welded to the troughs 17, as indicated by 19, and beyond the ends of the troughs such upper edges are welded to the ring 18, as indicated by 20. The shell plates 11 forming the cylindrical wall 10 are supported on the ring member 18 and preferably welded thereto, as indicated by 21.

The tank is provided with a balcony, here shown as formed of twelve segmental balcony plates 22, the inner edges of which are welded to the trough 17, as indicated by 23, and beyond the end of said trough, said balcony plates are welded to the ring member 18, as indicated by 24.

Each of the posts 13 is provided at its upper end with internal radial webs 13ª to assist in supporting the bottom plates 12 and with external radial webs 13ᵇ supporting the balcony plates 22.

The trough 17 is provided with an inwardly and downwardly extending apron 25 welded thereto at 26. The ring member 18 has a similar apron 25ª welded at 26ª. The aprons 25 and 25ª are provided with holes 27 and 28, respectively, to receive bolts (not shown) adapted to engage the holes 12ª in the bottom plates for temporarily supporting the same until the weld connections 19 and 20 can be made. The tops of the posts are provided with circumferential wing plates or webs 13ᶜ to assist in supporting the troughs 17 on the tops of the posts.

The exploded view Fig. 5 shows the respective units that are welded or otherwise formed in the shop. It is to be noted that the troughs 17 are attached to the tops of the posts 13 to form one unit. Four 90° sections of the ring 18 are preferably provided, each having three balcony plates 22 attached thereto. In erection, the posts are first put in place. The four ring sections 18 carrying the balcony plates 22 are then put into position in the troughs 17. The ends of the ring sections and adjacent edges of the balcony plates are then welded or otherwise fastened together in the field to provide a continuous ring 18 with balcony attached. The bottom plates 12 may then be temporarily supported in position by means of bolts (not shown) through the holes 27 in the aprons 25 and the holes 28 in the aprons 25ª, said bolts co-operating with registering holes 12ª in the upper edges of the bottom plates 12. It will be seen that the upper edges of the bottom plates are notched, as indicated by 12ᵇ, to accommodate the troughs 17. After the bottom plates are thus temporarily supported in place, their upper edges are welded to the trough 17 by the welds 19 and to the ring member 18, by the welds 20. Adjacent edges of the bottom plates are also welded or otherwise suitably fastened together. The shell plates 11 are then mounted on top of the ring member 18 and welded, as indicated by 21.

29 indicates the weld of the trough 17 to the upper end of the post member 13, said weld preferably being a shop weld.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A tank structure of the character described, including; a plurality of posts; arc-shaped troughs carried by the posts; a ring member lying in said troughs; bottom plates attached to the troughs and ring member; and shell plates supported on the ring member.

2. A structure as claimed in claim 1, in which the troughs and ring member are provided with inwardly and downwardly projecting aprons adapted for temporarily supporting the bottom plates.

3. A structure as claimed in claim 1, in which the ring member is provided with horizontal outwardly extending balcony plates.

FRED L. GOLDSBY.